United States Patent
Raghavan et al.

(10) Patent No.: US 10,454,598 B2
(45) Date of Patent: *Oct. 22, 2019

(54) METHOD AND APPARATUS FOR MITIGATING INTERFERENCE IN A WIRELESS COMMUNICATION SYSTEM

(71) Applicant: AT&T Intellectual Property I, L.P., Atlanta, GA (US)

(72) Inventors: Arvind Raghavan, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,696

(22) Filed: Apr. 13, 2018

(65) Prior Publication Data
US 2018/0234195 A1    Aug. 16, 2018

Related U.S. Application Data

(63) Continuation of application No. 15/437,984, filed on Feb. 21, 2017, now Pat. No. 9,973,288, which is a
(Continued)

(51) Int. Cl.
*H04B 17/309* (2015.01)
*H04W 72/08* (2009.01)
(Continued)

(52) U.S. Cl.
CPC .......... *H04B 17/309* (2015.01); *H04W 24/02* (2013.01); *H04W 24/08* (2013.01);
(Continued)

(58) Field of Classification Search
CPC .... H04B 17/309; H04W 24/02; H04W 24/08; H04W 72/0446; H04W 72/085
(Continued)

(56) References Cited

U.S. PATENT DOCUMENTS 8,755,791 B2 *  6/2014  Bontu ................... H04L 1/0026
                                                    455/423
2011/0222411 A1    9/2011  Koskinen et al.
(Continued)

FOREIGN PATENT DOCUMENTS

WO    2012/108876    8/2012

OTHER PUBLICATIONS

Lindbom, et al., "Enhanced Inter-cell Interference Coordination for Heterogeneous Networks in LTE-Advanced: A Survey", Dec. 7, 2011.

*Primary Examiner* — Sai Ming Chan
(74) *Attorney, Agent, or Firm* — Guntin & Gust, PLC; Andrew D. Raymond

(57) ABSTRACT

A process, device and computer-readable storage medium that incorporate teachings of the subject disclosure may include, for example, providing a first instruction to mobile user equipment to cause the mobile user equipment to perform a first channel quality assessment of a non-reduced power subframe of a wireless signal comprising the non-reduced power subframe, an almost blank subframe and a reduced power subframe. A second instruction is provided to the mobile user equipment to cause the mobile user equipment to perform a second channel quality assessment of the almost blank subframe. A determination is made as to whether the mobile user equipment is performing instantaneous channel quality measurements based on a result of the first channel quality assessment and a result of the second channel quality assessment. Other embodiments are disclosed.

20 Claims, 9 Drawing Sheets

Related U.S. Application Data continuation of application No. 14/617,191, filed on Feb. 9, 2015, now Pat. No. 9,615,278, which is a continuation of application No. 13/713,856, filed on Dec. 13, 2012, now Pat. No. 8,983,393.

(51) Int. Cl.
  *H04W 24/02* (2009.01)
  *H04W 24/08* (2009.01)
  *H04W 72/04* (2009.01)

(52) U.S. Cl.
  CPC ..... *H04W 72/0446* (2013.01); *H04W 72/085* (2013.01); *Y02D 70/00* (2018.01); *Y02D 70/1224* (2018.01); *Y02D 70/1242* (2018.01); *Y02D 70/1244* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/23* (2018.01)

(58) Field of Classification Search
  USPC ........................................... 370/352
  See application file for complete search history.

(56) References Cited

U.S. PATENT DOCUMENTS

| | | |
|---|---|---|
| 2012/0122440 A1 | 5/2012 | Krishnamurthy et al. |
| 2012/0213137 A1 | 8/2012 | Jeong et al. |
| 2013/0017793 A1 | 1/2013 | Henttonen et al. |
| 2013/0194950 A1 | 8/2013 | Haghighat et al. |
| 2013/0272274 A1 | 10/2013 | Ishida et al. |
| 2013/0301589 A1 | 11/2013 | Li et al. |
| 2013/0308548 A1 | 11/2013 | Kim et al. |
| 2014/0135028 A1 | 5/2014 | Wang et al. |
| 2014/0226650 A1 | 8/2014 | Miao et al. |
| 2014/0376398 A1* | 12/2014 | Li ................... H04L 1/0001 370/252 |
| 2015/0110024 A1* | 4/2015 | Manssour ......... H04W 72/1226 370/329 |
| 2017/0163360 A1 | 6/2017 | Raghavan |

\* cited by examiner

METHOD AND APPARATUS FOR MITIGATING INTERFERENCE IN A WIRELESS COMMUNICATION SYSTEM

CROSS-REFERENCE TO RELATED APPLICATIONS

This application is a Continuation of and claims priority to U.S. patent application Ser. No. 15/437,984, filed Feb. 21, 2017, which is a Continuation of U.S. patent application Ser. No. 14/617,191, filed Feb. 9, 2015, now issued U.S. Pat. No. 9,615,278, which is a Continuation of Ser. No. 13/713,856, filed Dec. 13, 2012, now issued U.S. Pat. No. 8,983,393. The contents of each of the foregoing are hereby incorporated by reference into this application as if set forth herein in full.

FIELD OF THE DISCLOSURE

The subject disclosure relates generally to method and apparatus for mitigating interference in a wireless communication system.

BACKGROUND

Heterogeneous networks include a relatively low-power base transceiver terminal or station, sometimes referred to as a "pico" or "femto" cell located within a wireless communications coverage footprint of a relatively high-power base transceiver station. The relatively high-power base transceiver station is sometimes referred to as a "macro" cell and can poses interference to mobile communications devices in communication with the base transceiver station of the relatively low-power or pico cell. For example, reception of downlink communications from a base transceiver station of a pico cell to a mobile communications device positioned with a region of overlapping wireless coverage between the macro cell and the pico cell, might be interfered with by downlinks from the macro cell to other mobile communications devices. Such unwanted interference might render the pico cell unusable within certain regions, for example, reducing an effective footprint of the pico cell. Another consequence includes a reduction in operational bandwidth resulting from a reduced signal to noise and interference ratio. The signal refers to a downlink from pico cell; whereas, noise and interference includes other downlinks and control signals from macro cell.

In order to improve the performance for mobile communication devices connected to such low power cells overlapped by macro cells, the macro cell can be operated to essentially stop transmitting during certain periods of time, e.g., certain subframes of a frame. Release 10 of the third-generation partnership project ("3GPP"), long term evolution ("LTE") standard provides a feature to reduce the likelihood of such interference, referred to as enhanced inter-cell interference coordination ("eICIC"). The standard specifies a limited number of almost blank subframes within each downlink communication frame, during which the macro cell base transceiver station only transmits a very limited amount of information, such as control information as may be necessary to maintain communications. The micro or femto cell is configured to coordinate downlink information to mobile communications devices during such almost blank subframes.

Mobile communications devices typically provide a base transceiver station of a cell with some measure of a wireless channel state, sometimes referred to as a channel assessment in the form of a channel quality indicator. The base transceiver station, for example, can use such channel quality indicators to establish a preferred communications rate, such as a maximum channel bit rate, by which the mobile communications device can communicate with the base transceiver station of the cell. For enhanced inter-cell interference coordination, communications devices compliant with release 10 of the 3GPP LTE standard are configured to perform channel state assessments and provide channel quality indicators with respect the almost blank subframes, the non-almost blank subframes, or both.

BRIEF DESCRIPTION OF THE DRAWINGS

Reference will now be made to the accompanying drawings, which are not necessarily drawn to scale, and wherein.

DETAILED DESCRIPTION

Figure 1:
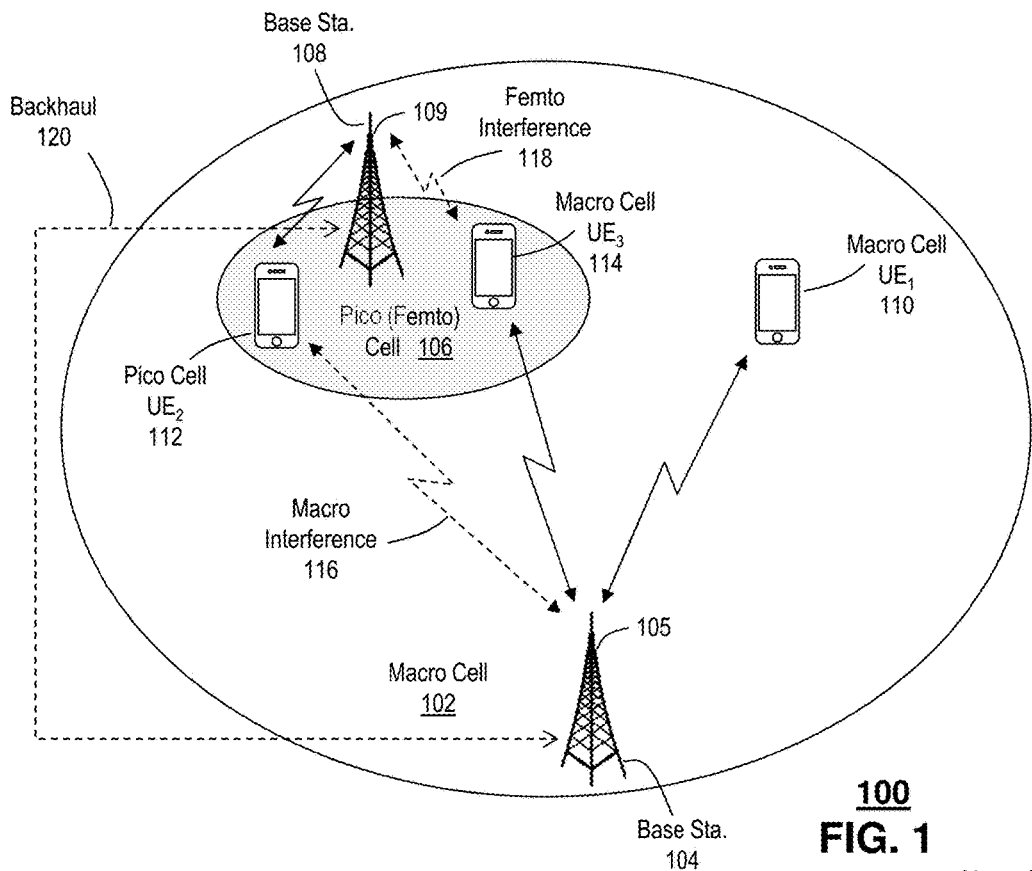
FIG. 1 depicts an illustrative embodiment of a communications system providing enhanced interference coordination for an overlaid deployment of cells.

The subject disclosure describes, among other things, illustrative embodiments of identifying a mobile communications device that is unable to distinguish between a non-reduced power subframe and a reduced-power subframe of a communications protocol including a pre-defined arrangement of non-reduced power and reduced-power subframes. The communication protocol is configured to provide enhanced inter-cell interference coordination by providing reduced-power subframes for use by a communication terminal subject to inference by another communication terminal.

Some mobile communications devices are not configured to discriminate between relatively low-power subframes and relatively high-power subframes of a communications protocol providing a pre-determined arrangement of relatively low-power subframes and relatively high-power subframes. An example of such devices are referred to as legacy devices, for example, operating according to release 8 of the 3GPP LTE communications protocol. Unfortunately, such devices are unable to discriminate between the relatively high and low power, or non-reduced power and reduced-power subframes. Accordingly, without the techniques disclosed herein, such wireless communications devices are unable to capitalize on the performance benefits offered by the enhanced inter-cell interference coordination, even if the base transceiver stations of the overlapping cells provide a predetermined arrangement of relatively low-power and high-power subframes, as in release 10 of the 3GPP LTE communications protocol.

Even if it were possible to somehow coordinate performance of a channel state assessment on the relatively low-power subframes, there would be no assurance as to whether the assessment would be representative of the relatively low-power subframes, or some combination of relatively low-power and high-power subframes. This situation results from a lack of specificity within the 3GPP LTE standard with regard to a manner in which the mobile communications device performs measurements in support of channel quality assessments. Namely, the standard does not specify whether the mobile communications devices should determine such channel state assessments with measurements within a single subframe, e.g., instantaneously, or as an average over multiple measurements made over different subframes.

The techniques disclosed herein include sending first and second instructions to an identified mobile communications device. The instructions cause the mobile communications device to perform a first channel quality assessment of a non-reduced power (e.g., a standard, or non-almost blank) subframe and a second channel quality assessment of a reduced-power (e.g., almost blank) subframe. The first and second instructions also respectively identify the non-reduced power and the reduced-power subframes within which the first and second channel quality assessments are to be performed. After receiving the first and second channel quality assessments, it is determined whether the channel quality assessments performed by the mobile communications device includes instantaneous or average measurements. Other embodiments are included in the subject disclosure.

One embodiment of the subject disclosure includes a process, which includes identifying, by a system including a processor, mobile user equipment that is unable to distinguish between non-reduced power and almost blank subframes of a third-generation partnership project ("3GPP"), long term evolution ("LTE") communications protocol. The communications protocol includes a frame having a pre-defined arrangement of a number of non-reduced power subframes and a number of almost blank subframes, wherein the almost blank subframes are characterized by a reduced downlink transmission power. A first instruction is sent by the system to the mobile user equipment. The first instruction causes the mobile user equipment to perform a first channel quality assessment of a non-reduced power subframe of the number of non-reduced power subframes. The first instruction identifies the non-reduced power subframe within which the first channel quality assessment is to be performed. A second instruction is also sent by the system to the mobile user equipment. The second instruction causes the mobile user equipment to perform a second channel quality assessment of an almost blank subframe of the number of almost blank subframes. The second instruction identifies the almost blank subframe within which the second channel quality assessment is to be performed. The first channel quality assessment and the second channel quality assessment are received by the system. Whether the mobile user equipment is performing instantaneous measurements of channel quality assessments is determined by the system based on the first channel quality assessment and the second channel quality assessment.

Another embodiment of the subject disclosure includes a device having a computer readable medium having instructions stored thereon and a processor. The processor, responsive to executing the instructions, performs operations including identifying a mobile communications device that is unable to distinguish between a non-reduced power subframe and a reduced-power subframe of a communications protocol including a frame having a pre-defined arrangement of a number of non-reduced power subframes and a number of reduced-power subframes. A first instruction is sent to the mobile communications device to cause the mobile communications device to perform a first channel quality assessment of a non-reduced power subframe of the number of non-reduced power subframes. A second instruction is also sent to the mobile communications device to cause the mobile communications device to perform a second channel quality assessment of a reduced-power subframe of the number of reduced-power subframes. The first channel quality assessment and the second channel quality assessment are received. Whether the mobile communications device is performing instantaneous measurements of channel quality assessments is determined based on the first channel quality assessment and the second channel quality assessment.

Yet another embodiment of the subject disclosure includes a computer-readable storage medium including computer instructions. The computer instructions, responsive to being executed by a processor, cause the processor to perform operations. The operations include identifying a wireless device that is unable to distinguish between a non-reduced power subframe and a reduced-power subframe of a communications protocol including a frame having a pre-defined arrangement of a number of non-reduced power subframes and a number of reduced-power subframes. A first instruction is sent to the wireless device to cause the wireless device to perform a first channel quality assessment of a non-reduced power subframe of the number of non-reduced power subframes. A second instruction is sent to the wireless device to cause the wireless device to perform a second channel quality assessment of a reduced-power subframe of the number of reduced-power subframes. The first channel quality assessment and the second channel quality assessment are received. Whether the wireless device is performing instantaneous measurements of channel quality assessments is determined based on the first channel quality assessment and the second channel quality assessment.

FIG. 1 depicts an illustrative embodiment of a communications system 100 providing enhanced interference coordination for an overlaid deployment of wireless communications regions, or cells. The system 100 includes a relatively high-powered wireless communications cell, sometimes referred to as an aggressor, shown as a macro cell 102. The macro cell 102 includes a macro base transceiver station 104 coupled to a first antenna 105. The macro base transceiver station 104 by way of the first antenna 105 provides geographic coverage approximated by the limits of the macro cell 102. Without restriction, macro cells 102 can include the coverage cells of wireless radio cellular network and without limitation can be measured on a scale of more or less than one to several square kilometers.

A first mobile communications device 110 ($UE_1$) positioned within the macro cell 102 is communicatively coupled, e.g., attached, to the base transceiver station 104.

Communications directed from the base transceiver 104 station to a first mobile communications device 110 can be referred to as downlink communications; whereas, communications directed from the mobile communications device 110 to the base transceiver station 104 can be referred to as uplink communications.

The communications system 100 also includes a relatively low-powered wireless communications cell, referred to herein as a pico or femto cell 106. The relatively small cell 106 respectively includes a relatively low-power base transceiver station 108 coupled to a second antenna 109. The relatively low-power, or pico base transceiver station 108 provides geographic coverage approximated by the limits of the pico cell 106. It is understood that the particular shape, relative size and location of the antennas 105, 109 with respect to the cells 102, 106 are provided for illustrative purposes and can vary substantially in different applications. In particular, it is also understood that any coverage region, such as the example macro cell 102 can include one or more areas within which reliable coverage is unavailable. Such regions can be referred to as "holes" or "blind spots" and may result from buildings, or geographical features, such as hills, valleys, etc. Such holes serve as examples of at least one motivation for providing overlapping coverage. For example, the pico cell 106 overlapping a portion of the macro cell 102 can provide more reliable coverage for the overlapping region 106 than would otherwise be available by the macro cell 102 if the macro cell 102 were subject to a hole or blind spot within a vicinity of the overlapping region 106.

Other motivations for providing overlapping coverage, particularly with respect to smaller coverage footprints, is an ability to offload data traffic from a macro cell 102 to one or more pico and femto cells 106. Pico cells 106, for example, can include the coverage provided by wireless access points and without restriction can be measure on a scale of more or less than tens to hundreds of square meters.

A second mobile communications device 112 (UE$_2$) positioned within an overlapping region of the pico cell 106 and the macro cell 102 is communicatively coupled, e.g., attached, to the pico base transceiver station 108. A third mobile communications device 114 (UE$_3$) is also shown positioned within the overlapping region of the pico cell 106 and the macro cell 102 is communicatively coupled, e.g., attached, to the macro base transceiver station 104.

Figure 2A:
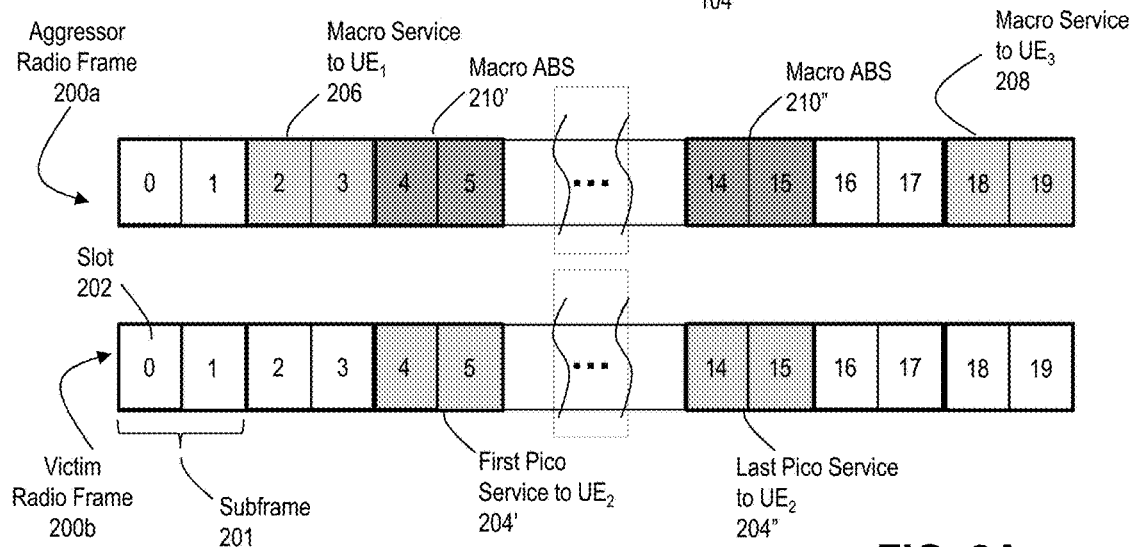
FIG. 2A depicts an illustrative embodiment of a subframe sequence used within portions of the systems described in FIG. 1 and FIGS. 3-7.

Each of the first, second and third mobile communications devices 110, 112, 114 can communicate with a respective one of the macro base transceiver station 104 and the pico base transceiver station 108 through a communications protocol. Communications protocols can include definitions of wireless communications frames, for example, including a number of subframes. An example of a macro cell radio frame 200a and a pico cell radio frame 200b, each providing a sequence of subframes is depicted in the illustration of FIG. 2A. The macro and pico cell radio frames 200a, 200b (generally 200) can include some number of subframes 201, for example ten subframes 201, each including one or more slots 202. The illustrative example includes two slots 202 are provided within each of ten subframes 201. Information provided within the slots 202 of the subframes can include one or more of data, control and signaling information. The 3GPP LTE protocol provides on such example of a radio frame 200 with an overall length of 10 milliseconds. The 3GPP LTE radio frame 200 can include ten subframes, each having a respective length of about 1 millisecond, and each including two slots having respective lengths of about 0.5 milliseconds. The example slots 202 are reference labeled from 0 to 19.

Such radio communications frames 200 can represent downlink communications radio frames 200 broadcast by each of the macro base transceiver station 104 and the pico base transceiver station 108. The base transceiver stations 104, 108 can communicate with one or more mobile communications devices, such as the three communications devices 110, 112, 114 of the illustrative example. Thus, it is advantageous for the base transceiver stations 104, 108 to identify one or more particular subframes 201 or slots 202 as being associated with a respective one of the mobile communications devices 110, 112, 114. Other subframes 201 or slots 202 can be used for monitoring and control purposes, for example, establishing a new call, performing a handoff of an existing call between cells 102, 106, and the like.

There is a possibility that any of the mobile communications devices 110, 112, 114 attached to one of the overlapping cells 102, 106 will experience interference from downlink frames of the other one of the overlapping cells 102, 106. For example, the second mobile communications device 112 attached to the pico cell 106 may perceive downlink signals broadcast from the macro cell 102 as interference. In this scenario, the macro cell 102 can be referred to as an aggressor, while the pico cell 106 is referred as a victim. If the second mobile communications device is relatively close to the pico base transceiver station 108, any interference from the macro cell 102 may not preclude successful attachment of the second mobile communications device 112 to the pico cell 106. However, should the second mobile communications device 112 be located farther away from the pico base transceiver station 108, interference from the macro cell 102 might result in a back off or similar adjustment of data rate to maintain reliable communications.

In the illustrative example, a second subframe 206 (i.e., slots 2 and 3) of the macro-cell radio frame 200a provides downlink service from macro cell 102 to the first mobile communications device 110. A third subframe 204' (i.e., slots 4 and 5) of the pico-cell radio frame 200b provides downlink service from pico base transceiver station 108 to the second mobile communications device 112. According to a communications protocol, the macro base transceiver station 104 provides corresponding almost blank subframe 210' during the third subframe, i.e., slots 4 and 5 of the macro-cell radio frame 200a, so as not to interfere with the downlink from the pico base transceiver station 108. Likewise, an eighth subframe 204" (i.e., slots 14 and 15 of the pico-cell radio frame 200b) provides downlink service from pico base transceiver station 108 to the second mobile communications device 112. According to the communications protocol, the macro-cell radio frame 200a provides corresponding almost blank subframe 210", i.e., slots 14 and 5 of the macro-cell radio frame 200a, so as not to interfere with the downlink from the pico base transceiver station 108. A final subframe 208 of the macro-cell radio frame 200a (i.e., slots 18 and 19) provides downlink service from macro base transceiver station 104 to the third mobile communications device 114.

Referring once again to FIG. 1, in at least some embodiments, the macro base transceiver station 104 and the pico base transceiver station 108 are communicatively coupled by another means, referred to herein as a backhaul network 120. The backhaul network 120 can include one or more different modes of communications including wired, wireless, optical, and the like. Backhaul networks 120 can be controlled by a mobile cellular service provider and used in coordinating operating a mobile cellular network providing wireless communications service over one or more geographic regions. In the illustrative example, the backhaul network 120 can allow the macro base transceiver station 104 to communication with the pico base transceiver station 108 to coordinate wireless service to one or more of the mobile communications devices 110, 112, 114. Such backhaul communications can be helpful in coordinating a handoff from one base transceiver satiation, e.g., from the macro base transceiver station 104 to the pico base transceiver station 108, and vice versa.

In the illustrative example, wireless communication service can be provided by the macro base transceiver station 104 to the first mobile communications device 110 without regard for the pico cell 106, as the first mobile communications device 110 is not located within a region of overlapping coverage 106. Wireless communications service can be provided by the pico base transceiver station 108 to the second mobile communications device 112, which happens to be located within a region of overlapping coverage served by the pico cell 106. Since the second mobile or wireless communications device 112 falls within overlapping coverage region 106, it may receive communications from the macro base transceiver station 104 as well as from the pico base transceiver station 108. When communicating with or otherwise "attached to" the pico cell 106, any communications from the macro cell 102 would generally represent interference, particularly if they occurred during periods when the second mobile communications device 112 is receiving information from the pico cell 106 by way of downlink communications. This can be referred to as a so called macro-pico interference scenario. It should be understood that such interference is not restricted to macro cells 102 or pico cells 106.

It is also conceivable that a mobile communications device, such as the third mobile communications device 114 located within a region of overlapping coverage of the pico cell 106 located at least partially within the macro cell 102 may nevertheless be configured for communications with the relatively high-power macro cell 102. Examples of scenarios when this might occur include a pico or femto cell 106 providing restricted service, for example, only to those wireless service subscribers also subscribed or are otherwise authorized for access to the femto cell 106. Such closed networks might exist, for example, within an office or academic environment in which access is limited to employees or students and otherwise not available for visitors.

When communicating with the macro cell 102, any communications from the femto cell 106 would generally represent interference, particularly if they occurred during periods when the third mobile communications device 114 is receiving information from the macro cell 102 by way of downlink communications. This can be referred to as a so called femto-macro interference scenario, although it is not restricted to femto cells 106 or macro cells 102. The techniques disclosed herein can be applied without restriction to either scenario.

It would be possible through provisions of a communications protocol for macro-pico interference at the second mobile communications device 112 to be alleviated or otherwise avoided. For example, release 10 of the 3GPP LTE communications protocol provides features referred to as enhanced inter-cell interference coordination. This features of the protocol reserve some number of the subframes 201 of a radio frame 200 during which the base transceiver station 104 transmits little or no power. These frames are referred to as almost blank frames and include minimum downlink communications by the interfering base transceiver station as may be necessary for maintaining proper control of the wireless network. Otherwise, the almost blank subframes provide regularly scheduled periods of reduced power operations in a radio frame 200 during which interference would be reduced.

Mobile communications devices operating under such a release 10 protocol are also generally aware of the existence of the almost blank subframes, when available, and can work together with a base transceiver station in a region of overlapping coverage to perform channel quality assessments and to receive downlink communications during almost blank subframes within radio frames broadcast by an interfering base transceiver station. In the macro-pico scenario, the second mobile communications device would be scheduled by the pico base transceiver station 108 to receive downlink communications by way of radio frames from the pico base transceiver station 108 during almost blank subframes provided in a corresponding downlink from the macro base transceiver station 104. This would allow the mobile communications device to experience an improved channel quality, for example, by way of an increased ratio of signal to noise and interference. The increased signal to noise and interference generally results from a reduction in the level of interference 116 that would otherwise be experienced by downlink communications from the macro cell 102, for example, to other mobile communications devices 110, 114 without the benefit of almost blank subframes. By also obtaining a channel assessment, or channel state, by the mobile communications device 112 during the almost blank frames and reporting the channel state to the pico base transceiver station 108, the base transceiver station 108 is able to select an greater downlink communications rate than would otherwise be available in the absence of the almost blank subframes.

Figure 2B:
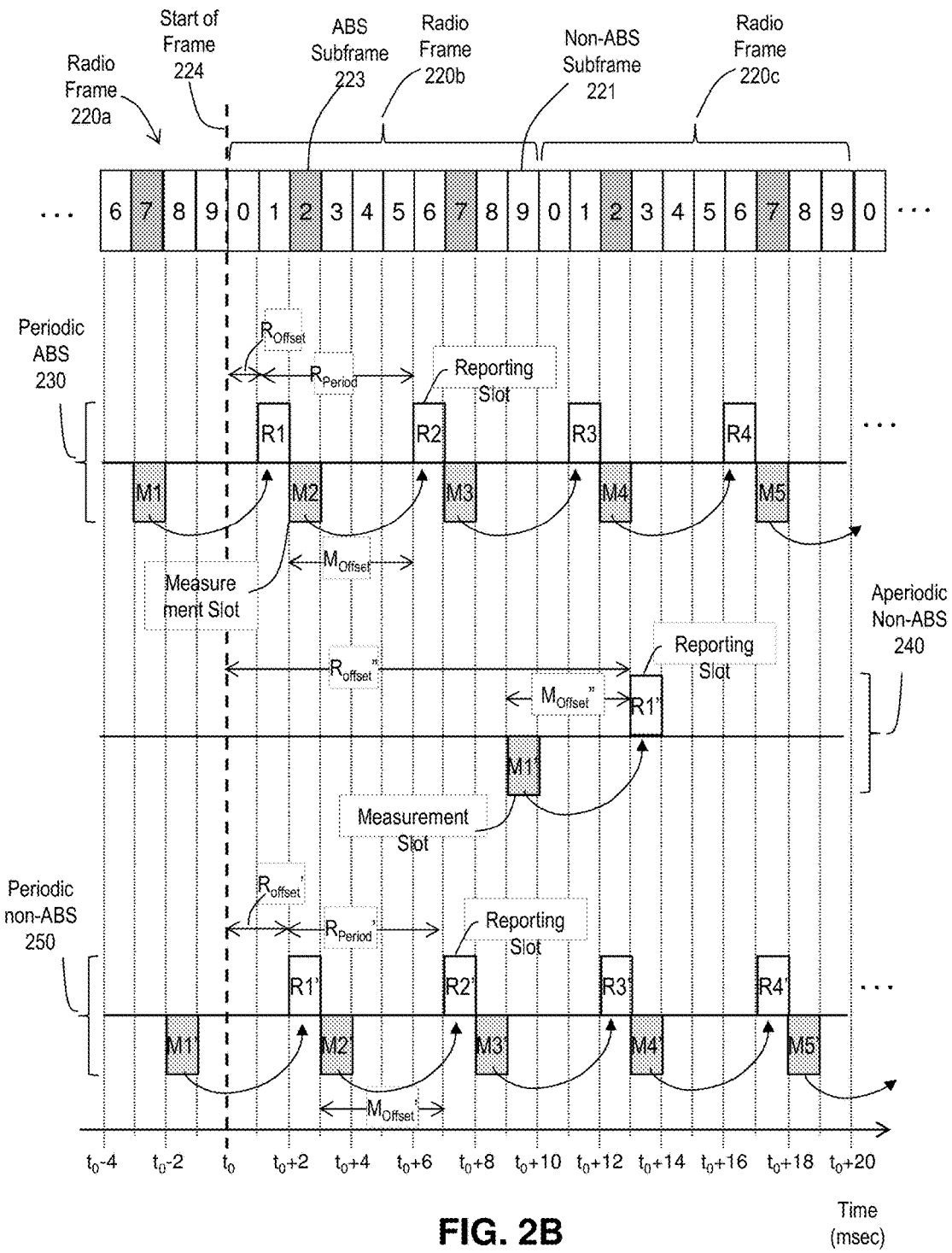
FIG. 2B depicts an illustrative embodiment of a downlink subframe with examples of mobile device channel quality assessment and reporting used within portions of the systems described in FIG. 1 and FIGS. 3-7.

FIG. 2B illustrates an example of a portion of a sequence of macro cell radio frames 220a, 220b, 220c (generally 220). The illustrative frame 220 includes ten subframes 221, 223. The frame 220 defines a start of frame 224 at the beginning of subframe "0," occurring at a time $t_0$. Each subframe 221, 223 in the illustrative example is 1 msec in length. A reference timeline is illustrated at the bottom of FIG. 2B.

In the illustrative example, two subframes 223 of each frame 220 are shaded: a first subframe "2," a second subframe "7." The resulting periodic pattern of shaded subframes 223, e.g., every $5^{th}$ subframe, repeats in each frame 220. It is understood that in some embodiments, a repeating periodic pattern can extend over a group of frames, e.g., across 4 frames, for a total of 40 subframes. The shaded subframes 223 represent relatively low power subframes, sometimes referred to as reduced-power subframes, or almost blank subframes. The remaining subframes 221 of each frame 220 represent sets of non-reduced power, or non-almost blank subframes, or unrestricted subframes.

In some embodiments, a mobile communications device can be directed to selectively perform channel quality assessments on reduced power subframes 223. A first periodic measurement scenario 230 is illustrated in which the mobile communications device performs measurements on the reduced-power subframes 223. Namely, a first measurement M1 is made within slot "7" of a first frame 220a. Likewise, second and third measurements M2, M3 are made within subframes "2" and "7" a second radio frame 220b, fourth and fifth measurements M4, M5 are made within subframes "2" and "7" a third radio frame 220c, and so on.

The measurements are periodic in that they each measurement is separated by a constant offset of 5 msec, or 5 slots.

Each measurement is reported on a different offset of subframes from the measurement subframe by a measurement offset value of $M_{Offset}$, of four subframes, or 4 msec. Thus, measurements R1 and R2 are reported at subframes "1" and "6" of the second frame 220b, measurements R3 and R4 are reported at subframes "1" and "6" of the third frame 220c, and so on. A mobile communications device can be instructed or otherwise adapted to make such periodic measurements by providing one or more of the measurement offset $M_{Offset}$, the measurement period $M_{Period}$ and the reporting period $R_{Period}$, of 5 slots, or 2.5 msec.

In some embodiments, the mobile communications device can be directed to selectively perform channel quality assessments on reduced power subframes 223, by identifying a periodicity of reporting subframes $R_{Period}$, and a reporting offset of a first reporting frame from a reference $R_{Offset}$ along with the measurement offset $M_{Offset}$ between respective measurement and reporting subframes. For situations in which a base transceiver station is aware of the locations of reduced power subframes 223, the base transceiver station can choose an appropriate periodicity of reporting subframes $R_{Period}$, and reporting offset $R_{Offset}$ such that the corresponding periodic measurement subframes being reported by the reporting subframes coincide with reduced power subframes 223. A similar approach can be used to direct the mobile communications device to perform measurements on non-reduced power subframes 221.

In some embodiments, a mobile communications device can be directed to perform channel quality assessments on non-reduced power subframes. A second periodic measurement scenario 250 is illustrated that makes measurements on the non-reduced-power subframes. In the illustrative example, a communications device performs measurements on the reduced-power subframes 221. Namely, a first measurement M1' is made within subframe "8" of a first frame 220a. Likewise, second and third measurements M2', M3' are made within subframes "3" and "8" a second radio frame 220b, fourth and fifth measurements M4, M5 are made within subframes "3" and "8" a third radio frame 220c, and so on. Once again, the measurements are periodic in that they each measurement is separated by a constant offset of 5 msec, or 5 slots.

Each measurement is similarly reported on a different subframe, separated from the measurement subframe by a value of $M_{Offset}'$, of four subframes, or 4 msec. Thus, measurements R1' and R2' are reported at subframes "2" and "7" of the second frame 220b, measurements R3' and R4' are reported at subframes "2" and "7" of the third frame 220c, and so on. A mobile communications device can be instructed or otherwise adapted to make such periodic measurements by providing one or more of the measurement offset $M_{Offset}'$, the measurement period $M_{Period}'$ and the reporting period $R_{Period}'$ of 5 slots, or 2.5 msec.

It is also possible that a mobile communications device be directed to perform an aperiodic channel quality assessment. In an example aperiodic measurement scenario 240, a measurement M1" is performed in a measurement subframe 224, in this instance, subframe "9" of the second frame 220b. The measurement M1" is reported at R1", occurring at subframe 3 of the third frame 220c, which also occurs at a time $R_{Offset}"$ after the reference start of frame 224. Although each of the measurements and corresponding reports occur in different slots, it is conceivable that in at least some instances a report is made during the same slot within which the measurement is made, i.e., the value of $R_{Offset}$ is zero. In general, reference to instantaneous measurements used herein includes any measurement that can be accomplished within a single subframe.

It is understood that references to instantaneous measurements used herein include single measurements performed within a subframe and multiple measurements performed within the same subframe. Multiple measurements made within the same subframe may themselves be averaged or otherwise combined and reported as an instantaneous measurement for the particular measurement subframe.

Figure 3:
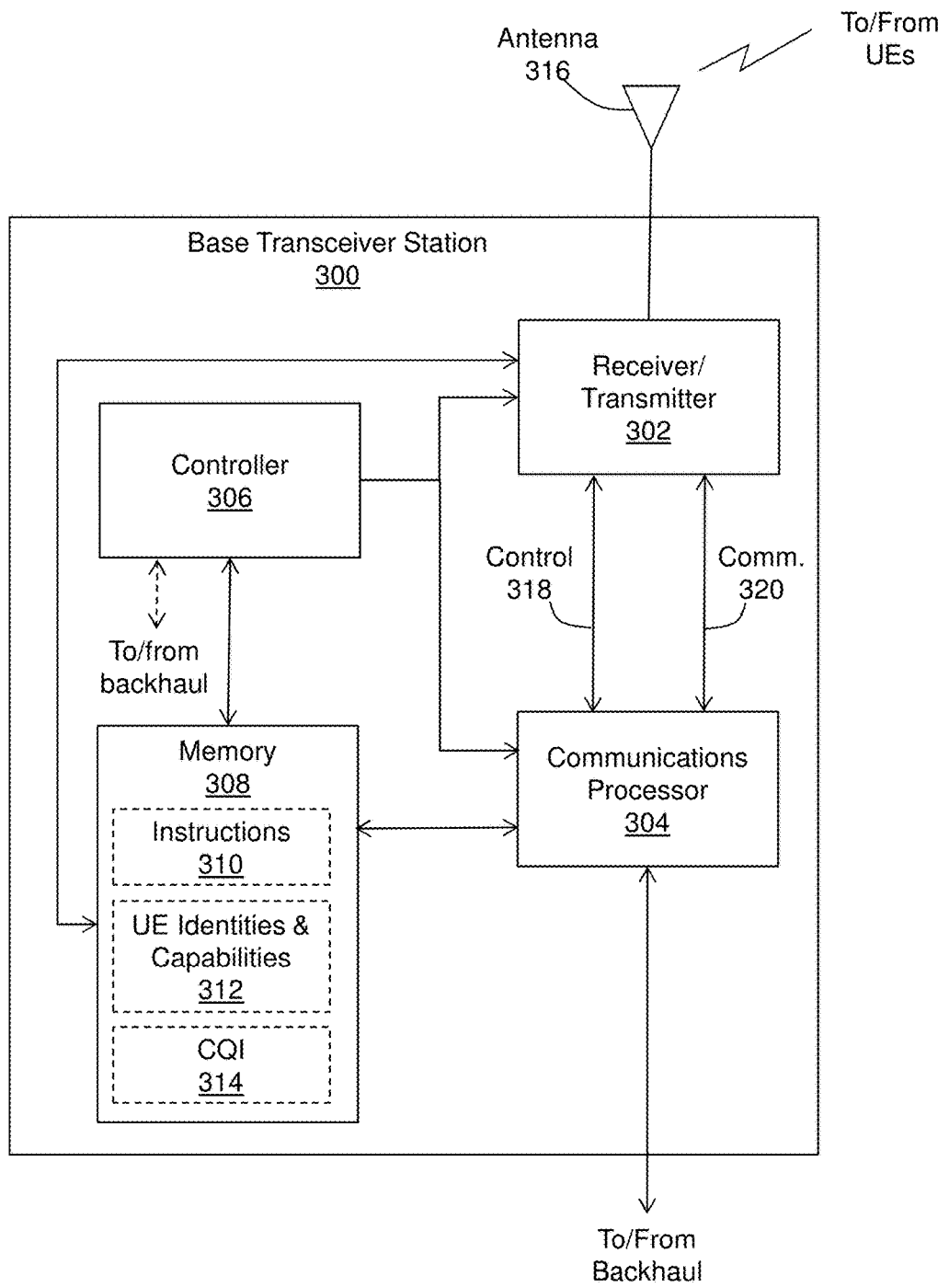
FIG. 3 depicts an illustrative embodiment of a base transceiver station of the communications system of FIG. 1 and FIGS. 5-7.

FIG. 3 depicts an illustrative embodiment of a base transceiver station 300 of the communications system of FIG. 1. The base transceiver station 300 includes a receiver and transmitter 302 and a communications processor 304. The communications processor 304 can be configured according to one or more communications protocols, such as release 10 of the 3GPP LTE communications protocol. Accordingly, the communications processor 304 can format or otherwise structure communications messages into radio frames 200 (FIG. 2A) for forwarding to one or more wireless devices, such as the mobile communications devices 110, 112, 114 (FIG. 1). The communications processor 304 can also format or otherwise structure communications messages received from one or more wireless devices 110, 112, 114 for forwarding to other communications nodes, such as other base transceiver stations within the same wireless communications network, other wireless communications networks and other terrestrial or satellite communications networks.

The receiver transmitter 302 can communicate with the communications processor 304 by way of baseband communications that can include one or more of communications messages 320 and control messages 318. For downlink communications broadcast by the base transceiver station 300, the receiver transmitter 302 can translate such baseband messages 318, 320 into radio frequency signals through any of various available signal processing techniques, and broadcast the radio messages through an antenna 316, for example by way of radio frames 200 (FIG. 2A) within a coverage region or cell 102, 106 (FIG. 1). For uplink communications, the receiver transmitter 302 can receive radio communications from one or more mobile communications devices 110, 112, 114 and in some instances, other base transceiver stations, 104, 108 by way of the antenna 316, translating the received radio signals to baseband signals through any of various available signal processing techniques. The baseband signals 318, 320 can be provided to the communications processor 304 for interpretation or further processing including distribution to other network entities.

The base transceiver station 300 can also include one or more controllers 306. For example, the controller can be coupled to one or more of the receiver transmitter 302 and the communications processor 304. The base transceiver station 300 can also include one or more memory devices 308 coupled to or otherwise accessible by one or more of the controller 306, the receiver transmitter 302 and the communications processor 304. The memory can store instructions 310, for example, for one or more of the controller 306, the receiver transmitter 302 and the communications processor 304 supporting operation of one or more of the receiver transmitter 302, the communications processor 304, and the controller 306 according to any of the various techniques disclosed herein.

In at least some embodiments, the memory 308 also stores records of identities of the mobile communications devices, sometimes referred to as user equipment, with which the base transceiver station 300 is communicating. Such identification information can include one or more of a telephone number, a caller identification, and an equipment or device identifier. One or more of the communications processor 304 and the controller 306 can be communicatively coupled with other network-accessible entities, for example, through one or more of the backhaul network 120 (FIG. 1) and some other network, such as a circuit-switched network or the Internet. When in possession of an identifier of a particular mobile communications device 110, 112, 114, the communications processor 304 and the controller 306 can obtain additional information about the particular device 110, 112, 114, such as its make, model, features, capabilities and the like. Such additional information can include whether a particular mobile communications device 110, 112, 114 is configured for operation with a particular protocol, such as 3GPP LTE release 10, or some earlier release, such as release 8. Such additional information, such as user equipment identities 312, capabilities and the like can be stored, at least temporarily during an active communication session, within the memory 308 and thereby accessible to one or more of the controller 306 and the communications processor 304. It is also conceivable that the memory can store additional information, such as channel state information, e.g., channel quality indicators 314.

Figure 4A:
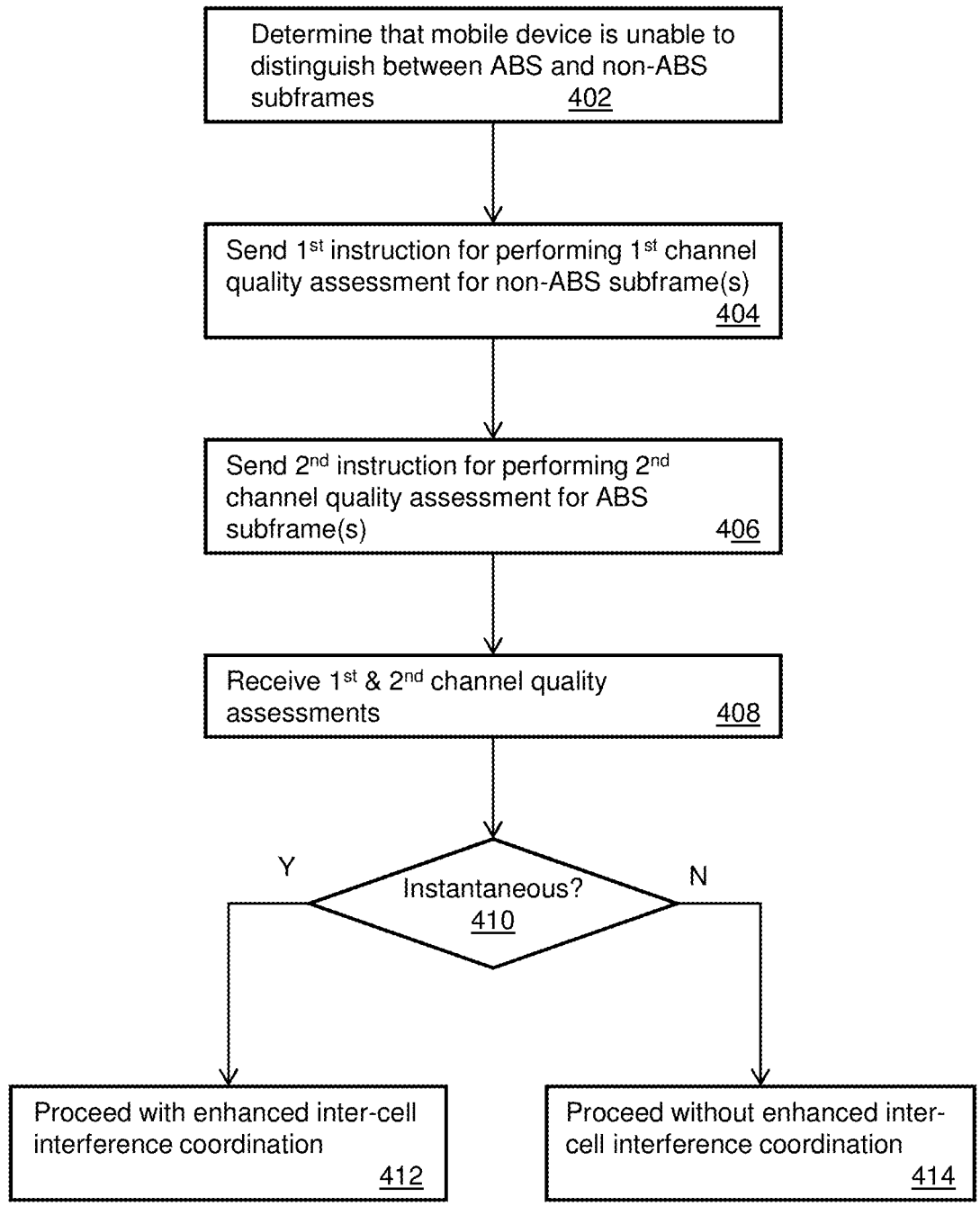
FIGS. 4A-4B depict illustrative embodiments of processes operating in portions of the system described in FIGS. 1 and 3, and FIGS. 5-7.

FIG. 4A depicts an illustrative embodiment of a process 400 used by the communications system of FIG. 1. The process determines at 402 whether a mobile communications device 112 is unable to distinguish between relatively low-power frames, e.g., almost blank subframes (ABS) and relatively high-power frames, e.g., non-reduced power or non-ABS subframes. Such a determination can be obtained, for example, by determining an identity of the mobile communications device 112, which can include or otherwise be used to obtain features, capabilities of the mobile communications device 112, for example, by accessing an association of identities and features or capabilities, such as a database or table as may be obtained by a mobile communications service provider by way of normal operations.

Alternatively or in addition, the mobile communications device 112 can respond to a query providing an indication as to whether the mobile communications device 112 is capable of distinguishing between ABS subframes and non-ABS subframes. An example of a query response can include an indication of operating software and/or firmware of the mobile communications device 112. For example, a mobile communications device 112 responding to such a query might indicate that it is operating according to 3GPP LTE, Release 8 compliant software. It is generally known that Release 8 devices are generally incapable of distinguishing between ABS and non-ABS subframes; whereas, a communications device 112 configured with Release 10 compliant software would be.

Relatively low-power subframes can include subframes providing a reduced level of interference for operation within overlapping coverage regions, such as within the pico cell 106 which overlaps a portion of the macro cell 102. Low-power subframes can include almost blank subframes of a communications protocol, such as 3GPP LTE, release 10, whereby downlink communications within the macro cell 102 are temporarily reduced in power level to provide opportunities for the overlapping pico cell 106 to provide downlink communications to a mobile communications device within the overlapping region of coverage. The relatively high-power subframes include standard or non-reduced power subframes within which a downlink of a macro cell 102 operates without any intentional or otherwise pre-coordinated power restriction.

A first instruction is sent at 404 to the mobile communications device 112 instructing the mobile communications device 112 to perform a first channel quality assessment of a non-reduced-power subframe. A second instruction is sent at 406 to the mobile communications device 112 instructing the mobile communications device 112 to perform a second channel quality assessment of a relatively low-power, ABS subframe. It is presumed that a device, such as one of the base transceiver stations 104, 108 would have access as to which subframes 201 of the radio frame 200 (FIG. 2A) are standard or non-reduced power subframes and which are reduced-power, ABS subframes. The particulars of such subframes 201 can be predefined according to a predetermined arrangement of subframes, e.g., during an initialization phase, or by default. For example, certain subframes of each frame, such as subframes 2 and 7, can be designated as relatively low-power, reduced-power or almost blank subframes. The base transceiver station 104, 108 can simply include within the instruction, one or more particular subframes, e.g., by reference number, or time reference, to ensure that the mobile communications device 112, even though unaware as to a characterization of a particular subframe as one of a non-reduced power or an almost blank subframe, will report the first and second results according to the proper subframes. For periodic measurements, the base transceiver station 104, 108 can include within the instruction one or more of a measurement period, a reporting offset $R_{Offset}$, a reporting period $R_{Period}$, and a measurement offset $M_{Offset}$ as a number of subframes between a measurement and reporting of the measurement.

Channel quality assessments are received at 408 and a determination is made at 410, as to whether the mobile communications device 112 is performing the channel assessments according to an instantaneous measurement technique, e.g., measured within a single subframe, or according to an averaging technique, e.g., average of measurements made across more than one subframe. In some embodiments, the determination includes a comparison of the first and second channel quality assessments. To the extent that a mobile communications or wireless device is performing instantaneous measurements, any first channel quality assessments will be substantially different from any second channel quality assessments. This will result from the channel quality assessment being performed in the presence of the interference, e.g., from the macro cell 102 being included within the channel quality assessment of a non-reduced power subframe, and not included within the channel quality assessment of a reduced-power (almost blank) subframe.

The comparison can include computing an algebraic difference between the first and second channel quality assessments, resulting in a difference value. The difference value can be compared to a threshold value, such that instantaneous measurements can be concluded if the magnitude of the difference is greater than the threshold value.

Likewise, to the extent that a mobile communications or wireless device is performing averaging measurements, each of the first and second channel quality assessments will very likely include contributions of interference from the macro cell. An algebraic difference between the first and second channel quality assessments, resulting in a difference value that is below the threshold value, would allow for a conclusion that the averaging measurements are being made.

The comparison can also include a geometric or ratio metric value, as might be obtained by forming a ratio between the first and second channel quality assessment values. To the extent that the ratio differs from one by greater than some threshold value, it can be concluded that instantaneous measurements are being made. Likewise, to the extent that the ratio differs from one by less than some threshold value, it can be concluded that averaging measurements are being made by the mobile communications or wireless device. In some embodiments, the difference can be defined by a percentage, e.g., 1%, 5%, 10% or more or a decibel value, e.g. 1 dB, 2 dB, 3 dB, or more.

For mobile communications devices 112 performing instantaneous measurements, the reported channel quality assessments can be relied upon as being indicative of one of the non-reduced power subframes and the almost blank subframes according to which subframe the mobile communications device 112 was instructed to make the measurement upon. Thus, the mobile communications device 112, despite being unaware as to the availability or existence of almost blank subframes provided by an implementation of enhanced inter-cell interference cooperation, is able to work in cooperation with a base transceiver station 104, 108 to enjoy the benefits of enhanced inter-cell interference cooperation.

Unfortunately, full implementation of enhanced inter-cell interference coordination will not be available for mobile communications devices 112 for which it has been determined that averaging among cells has been applied in determining channel quality assessments. However, the mobile communications device 112 will continue to benefit from relatively low-power subframes of the macro cell 102. Namely, the pico cell 106 provides downlink communications to the mobile communications device 112 during almost blank subframes. Thus the mobile communications device 112 receives the downlink from the pico cell 106 with reduced interference from the macro cell 102. The mobile communications device will continue to report channel quality assessment for the assigned subframes, e.g., for almost blank subframes. However, the channel quality assessments will very likely overestimate the level of interference as the results are averaged across multiple subframes, which may include non-reduced power subframes. Consequently, the pico cell 106 will establish a lower bit rate than would otherwise be available because of the misleading over prediction of interference.

To the extent that it is determined at 410 that the mobile communications device 112 is performing instantaneous measurements, operations proceed with enhanced inter-cell interference coordination 412. According to enhanced inter-cell interference coordination, the mobile device selectively updates channel quality assessments during non-reduced power, e.g., non-ABS subframes or during reduced power, e.g., ABS subframes.

Figure 4B:
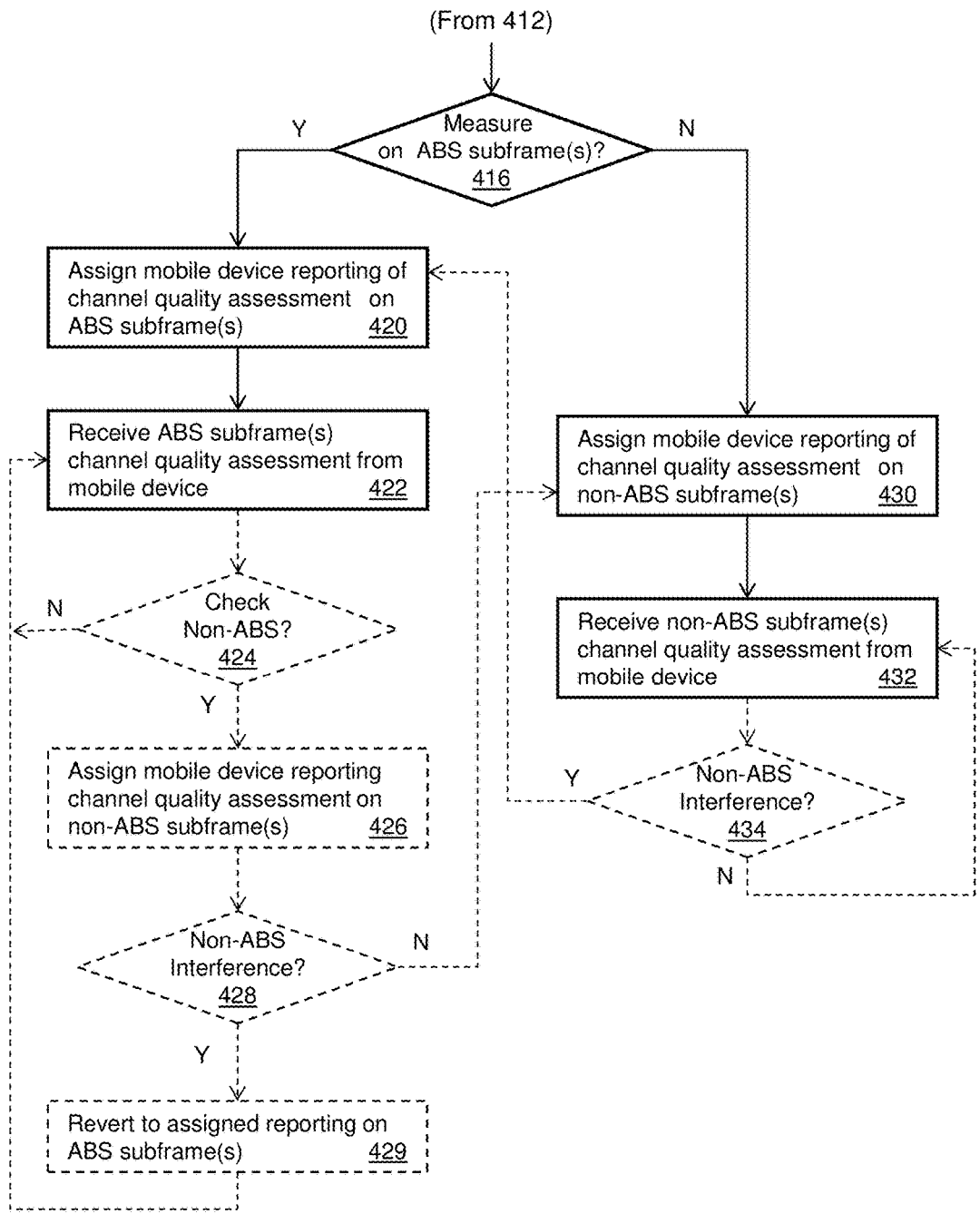

Referring next to FIG. 4B, it is determined at 416 whether the mobile device performs channel quality assessments on ABS subframes or non-ABS subframes. Such a determination can be established by one or more of the first and second channel quality assessments already made, or by further measurements, or a combination of measurements already made and further measurements. Since channel quality assessments already made have been performed on both ABS and non-ABS subframes, the results can be used to determine whether operation on non-ABS subframes would be acceptable. For example, the pico base transceiver station 108 (FIG. 1) can interpret the first and second channel quality assessment results and determine whether a suitable signal to noise and interference ratio could be established during non-ABS subframes for the mobile device. Alternatively or in addition, additional measurements can be made to support a determination of whether measurements should be made on ABS subframes or non-ABS subframes.

To the extent it is concluded that the signal to noise and interference would be acceptable for non-ABS subframes, the pico base transceiver station 108 instructs the second mobile communications device 112 to perform further channel quality assessments on non-ABS subframes by assigning mobile device reporting of the channel quality assessments on non-ABS subframes at 430. The pico base transceiver station 108 receives non-ABS subframe quality assessments from the mobile device 112 at 432. In some embodiments, it is determined whether there is non-ABS interference at 434 (shown in phantom). Such a determination can be made by the pico base transceiver station 108 interpreting, for example, that the signal to noise and interference is unacceptable in response to non-ABS channel quality assessments received from the mobile device 112. To the extent non-ABS interference is determined at 434, the mobile device can be assigned to report channel quality assessment on ABS subframes at 420, directing that subsequent channel quality assessments at 422 made by the mobile device occur on ABS subframes. Otherwise, the mobile device 112 continues to report on channel quality assessments made during non-ABS subframes, which are received at 432.

To the extent this is determined at 416 that the mobile device 112 perform channel quality assessments on ABS subframes, the pico base transceiver station 108 instructs the second mobile communications device 112 at 420 to perform further channel quality assessments on ABS subframes by assigning mobile device reporting of the channel quality assessments on non-ABS subframes. The pico base transceiver station 108 receives ABS subframe quality assessments from the mobile device 122 at 422.

In some embodiments, it is desirable to periodically check non-ABS channel quality assessments at 424 (shown in phantom) to determine whether it would be possible to reassign the mobile device to report channel quality assessments on non-ABS subframes. Whether non-ABS channel quality assessments should be made can be determined according to one or more of a schedule and an event. To the extent that it is not determined to check non-ABS channel quality assessments at 424, the pico base transceiver station 108 continues to receive channel quality assessments from the mobile device 112 made during ABS subframes at 422. Otherwise, the mobile device 122 is assigned to report channel quality assessment on at least one non-ABS subframe at 426 (shown in phantom).

A determination is made at 428 (also shown in phantom) as to whether interference exists on the one or more non-ABS subframes. To the extent it is determined at 428 that the non-ABS channel quality assessments are unacceptable, e.g., that there is non-ABS interference, the mobile device 112 reverts to reporting on ABS subframes at 429 (shown in phantom). Reversion to ABS reporting can be accomplished by reassignment of ABS measurement slots, for example, by the pico base transceiver station 108, or without a need for reassignment, when the assignment at 426 is aperiodic or one time only.

To the extent it is determined at 428 that the non-ABS channel quality assessments are acceptable, no non-ABS interference, a reassignment of the mobile device reporting of channel quality assessment on non-ABS subframes is made at 430. The channel quality assessments are received at 432. Accordingly, a mobile device can initially be instructed to measure channel quality assessments on one of ABS subframes or non-ABS subframes, and subsequently redirected to perform future measurements on the other. This allows for the pico base transceiver station to manage channel quality assessment reporting of devices 112 to minimize or otherwise limit operation on ABS subframes to those devices that require such operation, e.g., devices at fringe regions of the pico cell 106.

By way of example, the second mobile communications device 112 (FIG. 1) is communicatively attached to the pico base transceiver station 108. After determining that the second mobile communications device 112 is unable to distinguish between ABS and non-ABS subframes, as in a 3GPP LTE Release 8 device, and that the device 112 is performing instantaneous measurements. The device 112 is instructed as to when to perform channel quality assessments. Such instructions can be provided, for example, by the pico base transceiver station 108 and can direct the device 112 to perform measurements selectively on ABS subframes 223 or non-ABS subframes 221 (FIG. 2B). Such measurements can be performed periodically or a periodically as disclosed herein.

It is generally desirable to minimize the number of reduced power subframes as poses restrictions on the aggressor cell, e.g., the macro cell 102. To the extent that the second mobile device 112 is capable of operating without imposing or otherwise relying on reduced power subframes, it should do so. For example, if the second communications device receives a strong downlink signal from the pico base transceiver station 108, the signal to noise and interference observed during channel quality assessments made by the device 112 on non-reduced power subframes may be sufficient for normal operation without having to rely on the reduced power subframes. Such results may occur for devices 112 located within the pico cell 106 coverage, but not at the outer or fringe regions of coverage. For devices 112 located within such fringe regions, reliance on reduced power subframes may be necessary. Understanding that the devices 112 are mobile and that radio wave propagation is subject to changes, for example, caused by environmental conditions, it is desirable that devices 112 be operated in a manner that allows for transition in performing channel quality assessment between reduced power subframes and non-reduced power subframes.

To the extent it is determined at 410 that the mobile communications device 112 is performing average measurements, operations proceed without enhanced inter-cell interference coordination at 414. A pico-connected mobile device, such as the mobile communications device 112 (FIG. 1) can still be instructed as to one or more of when to perform channel quality assessments and when to report such measurements. The downlink communications rate from the pico base transceiver station 108 to the mobile communications device 112 is set to an intentionally low value. The low value can be established according to the channel quality assessments received by way of the averaging measurements which overemphasize the impact of interference from the macro cell 102. In at least some embodiments, the downlink communications rate from the pico cell 106 to the mobile communications device 112 can be updated by a trial and error process. Communicate with mobile communications device 112 ensues according to the updated communications rate.

Figure 5:
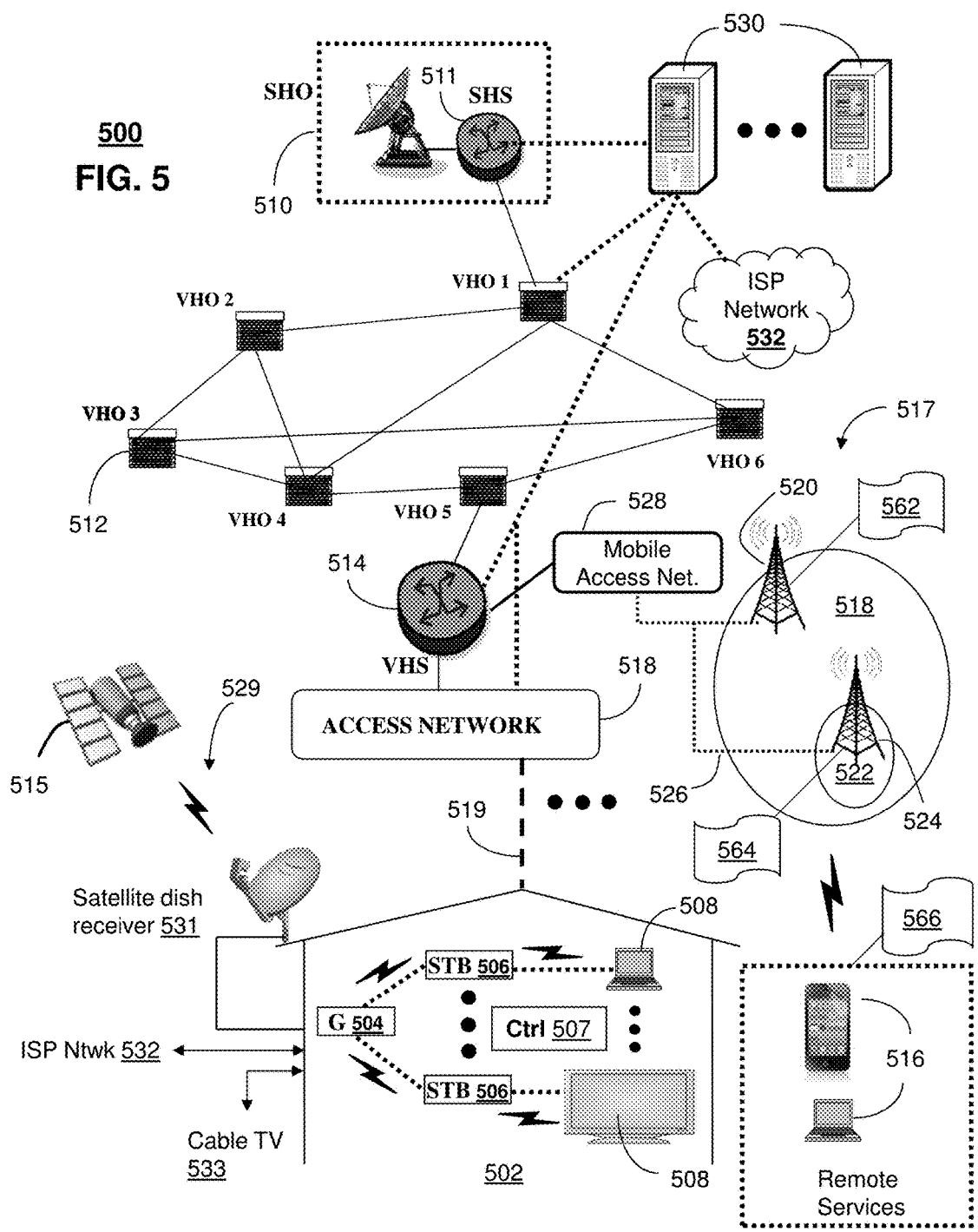
FIGS. 5-6 depict illustrative embodiments of communication systems that provide media services.

FIG. 5 depicts an illustrative embodiment of a first communication system 500 for delivering media content. The communication system 500 can represent an Internet Protocol Television (IPTV) media system. Communication system 500 can be overlaid or operably coupled with the communications system 100 (FIG. 1) providing enhanced interference coordination for an overlaid deployment of cells as another representative embodiment of communication system 500. For example, a base transceiver station determines whether a mobile device 516 located an overlapping region of a macro cell 518 and a pico cell 522 is unable to distinguish almost blank subframes from non-reduced power subframes of a communications protocol. The base transceiver station 520, 524, able to distinguish between such subframes, sends instructions to the mobile device 516 to perform a channel assessment on one of the almost blank subframes and one of the non-reduced power subframes. The base transceiver station 520, 524 receives the channel assessment results, and distinguishes therefrom whether the mobile device 516 is using an instantaneous process or an averaging process when performing the channel assessments.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the base transceiver stations 520, 524 to perform a function related to enhanced inter-cell interference coordination (herein referred to as interference coordination software functions or processes 562, 564). The interference coordination processes 562, 564 can use computing and communication technology to perform a function, which can include among other features, identification of mobile communications devices 516 (e.g., 3GPP LTE release 8) that are unable to distinguish almost blank, or otherwise relatively low-power subframes from non-reduced power, or otherwise relatively high-power subframes (e.g., 3GPP LTE release 10). The wireless communication devices 516 can be provisioned with software functions 562 that may or may not allow it to distinguish between the different subframes.

Multiple forms of media services can be offered to media devices over landline technologies such as those described above. Additionally, media services can be offered to media devices by way of a wireless access base transceiver station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
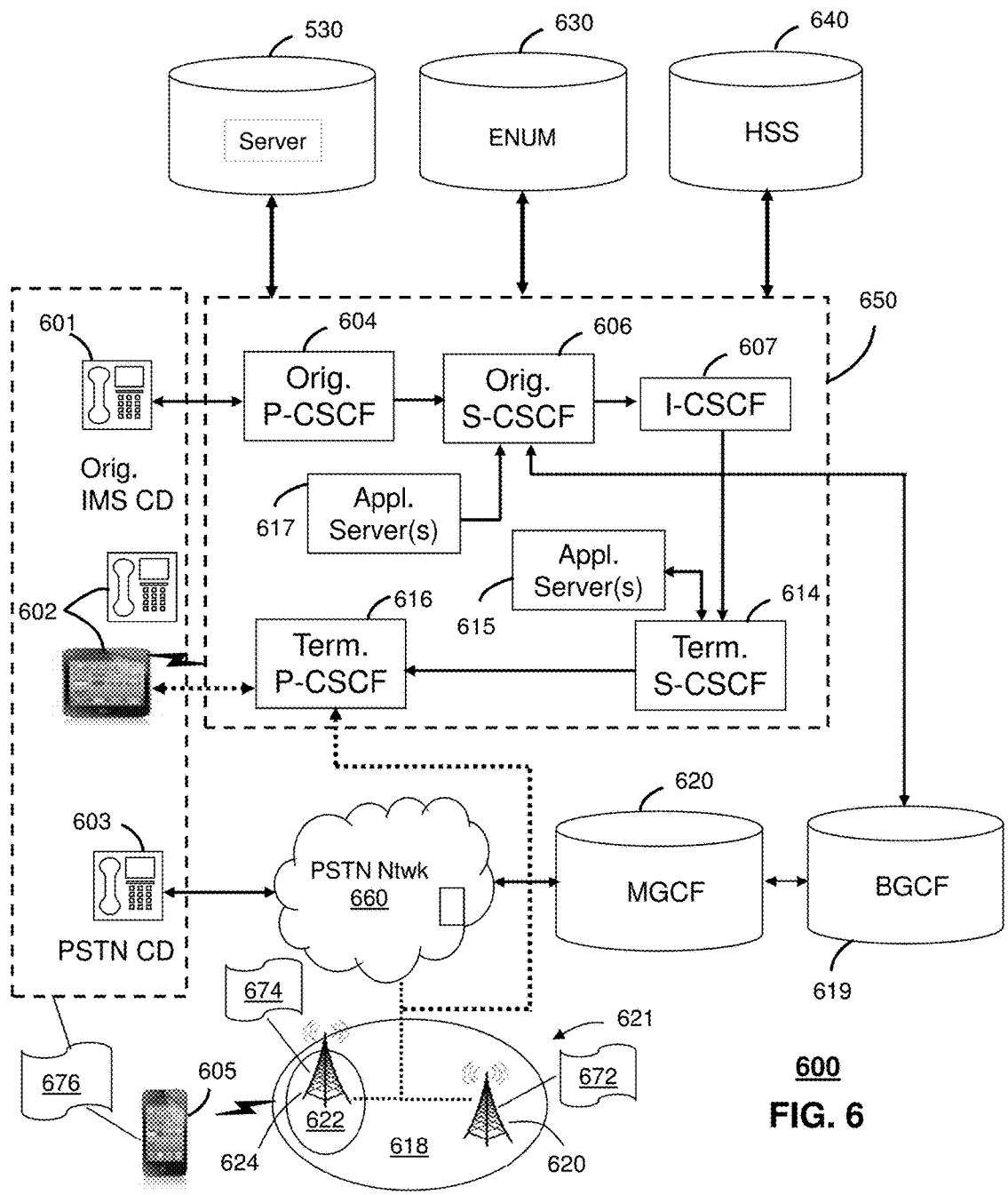

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with the communications system 100 (FIG. 1) providing enhanced interference coordination for an overlaid deployment of cells and communication system 500 as another representative embodiment of communication system 600. For example, a base transceiver station 620, 624 determines whether a mobile device 605 located an overlapping region of a macro cell 618 and a pico cell 622 is unable to distinguish almost blank subframes 210 (FIGS. 2A-2B) from non-reduced power subframes of a communications protocol. The base transceiver station 620, 624, able to distinguish between such subframes, sends instructions to the mobile device 605 to perform a channel assessment on one of the almost blank subframes and one of the non-reduced power subframes. The base transceiver station 620, 624 receives the channel assessment results, and distinguishes therefrom whether the mobile device 605 is using an instantaneous process or an averaging process when performing the channel assessments.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base transceiver station 621, a femtocell, a WiFi router, a Digital Enhanced Cordless Telecommunications (DECT) base unit, or another suitable wireless access unit to establish communications with the IMS network 650 of FIG. 6. The cellular access base transceiver station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base transceiver station 621 may communicate directly with the IMS network 650 as shown by the arrow connecting the cellular base transceiver station 621 and the P-CSCF 616.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The base transceiver stations 620, 624 can perform processes 672, 674 thereby provide enhanced inter-cell interference coordination services to the CD 605 of FIG. 6. CD 605, which can be adapted with software to perform function 676 to utilize the services of the base transceiver stations 620, 624 and otherwise adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
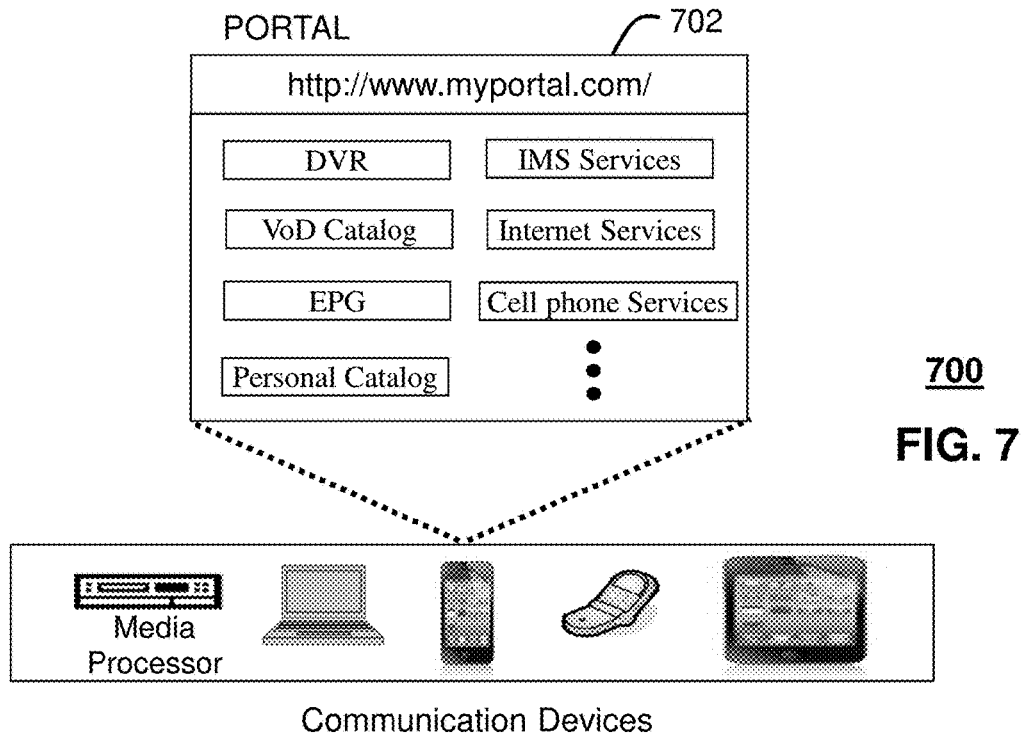
FIG. 7 depicts an illustrative embodiment of a web portal for interacting with the communication systems of FIGS. 1 and 3, and FIGS. 5-6.

FIG. 7 depicts an illustrative embodiment of a web portal 702 which can be hosted by server applications operating from the computing devices 530 of the communication system 500 illustrated in FIG. 5. Communication system 700 can be overlaid or operably coupled with system 100 (FIG. 1), communication system 500 (FIG. 5), and/or communication system 600 (FIG. 6) as another representative embodiment of the communication system 100, the communication system 500, and/or communication system 600. The web portal 702 can be used for managing services of communication systems 500-600. A web page of the web portal 702 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

Figure 8:
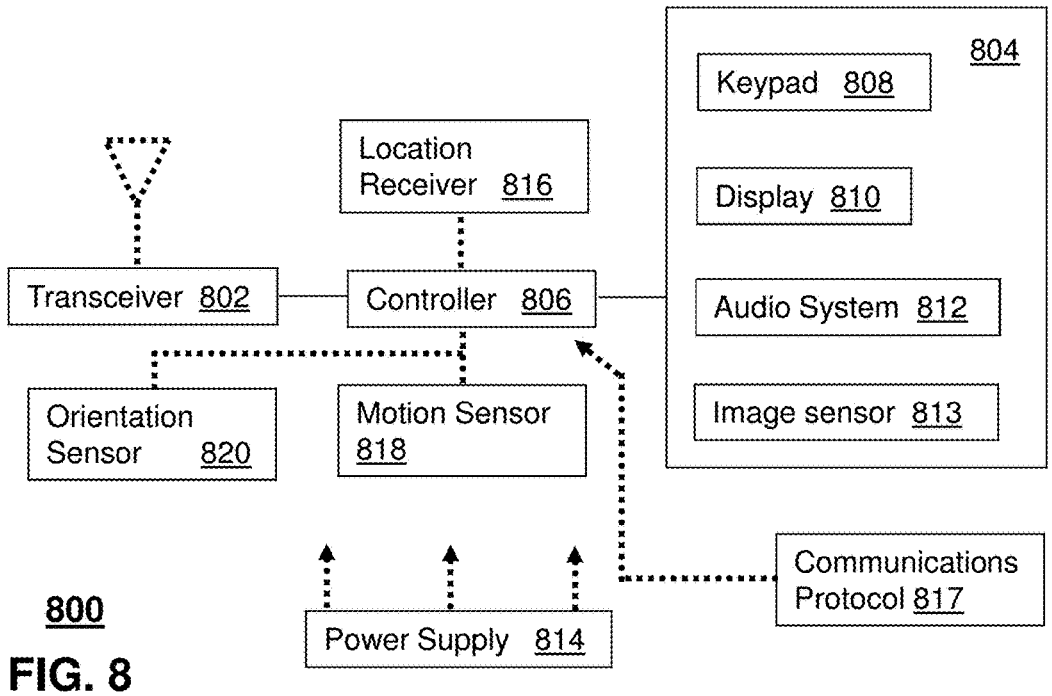
FIG. 8 depicts an illustrative embodiment of a mobile communication device.

FIG. 8 depicts an illustrative embodiment of a mobile communications device 800. The mobile communications device 800 can serve in whole or in part as an illustrative embodiment of the devices depicted in FIGS. 1 and 5-7. For example, in at least some embodiments, the mobile communications device 800 when located an overlapping region of a macro cell 102 and a pico cell 106 is unable to distinguish almost blank subframes from non-reduced power subframes of a communications protocol. The mobile device 800 receives instructions from a base transceiver station 104, 108 to perform a channel assessment on one of the almost blank subframes and one of the non-reduced power subframes. The mobile communications device sends the channel assessment results to the base transceiver station 104, 108. The base transceiver station 104, 108, having determined whether the mobile communications device 800 implements an instantaneous or averaging measurement, directs the mobile communications device 800 to receive downlink from the pico cell 106 during one or more almost blank subframes of the macro cell 102. The mobile communications device 800 further communicates with the pico cell 106 at a communication rate established by the pico base transceiver station 108 in response to the aforementioned processes.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 500 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in communication systems 500-600 of FIGS. 5-6 such as a gaming console and a media player.

The communication device 800 shown in FIG. 8 or portions thereof can serve as a representation of one or more of the devices of the communication system 100 of FIG. 1, the communication system 500, and the communication system 600. In addition, the controller 806 can be adapted in various embodiments to perform the functions 566 and 676, respectively.

Upon reviewing the aforementioned embodiments, it would be evident to an artisan with ordinary skill in the art that said embodiments can be modified, reduced, or enhanced without departing from the scope of the claims described below. For example, the processes can be used in relation to interference between adjacent cells, such as adjacent macro cells 102 or adjacent pico or femto cells 106 to coordinate or otherwise eliminate or reduce adjacent cell interference. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
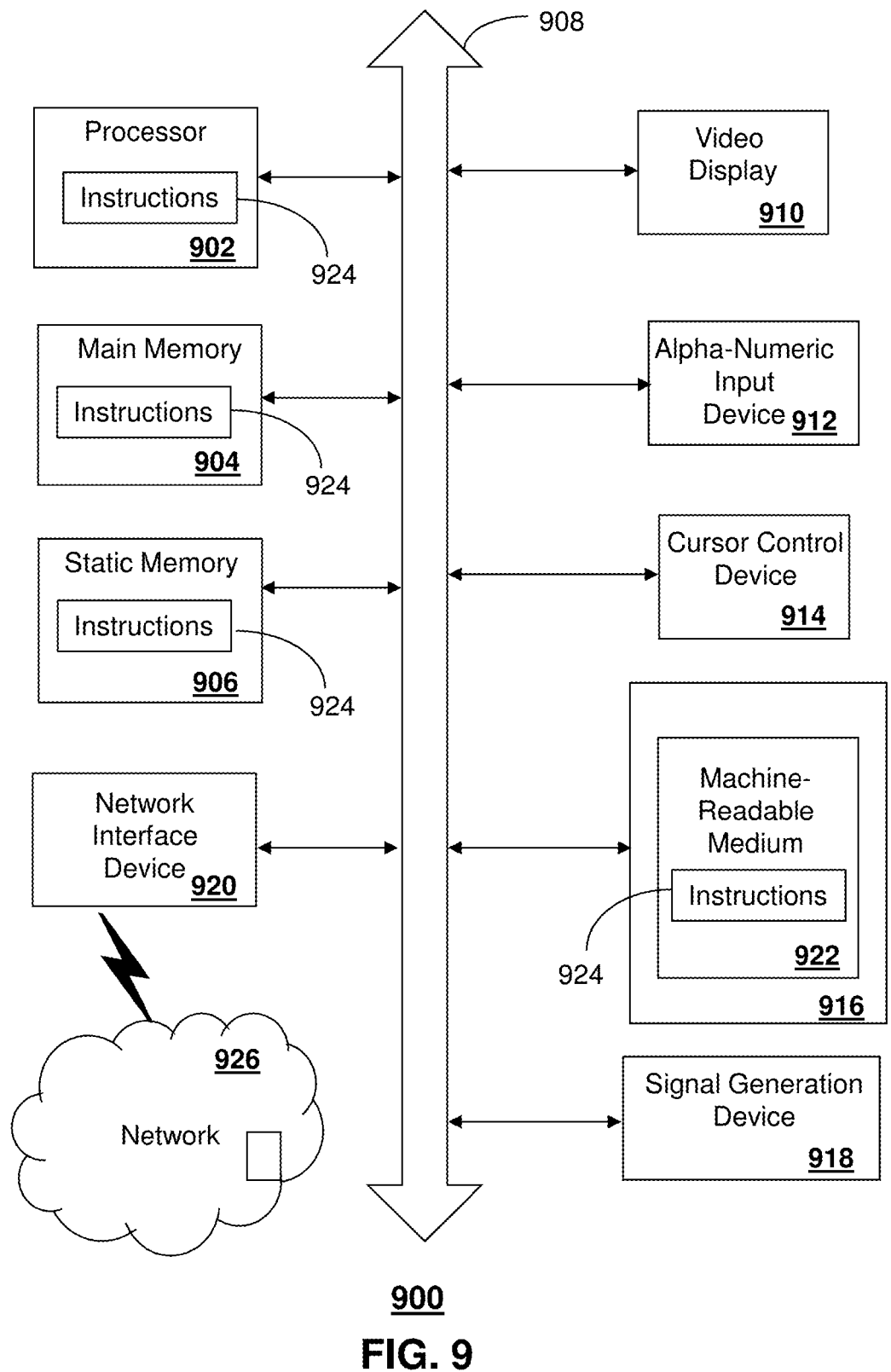
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the base transceiver station 104, 108, 300, 520, 524, 672, 674, elements of the base transceiver station, such as the controller, 308, the communications processor 304, and the receiver and transmitter 302, as well as one or more of the mobile communications devices 110, 112, 114, 516, 605 and other devices of FIGS. 1-3 and 5-8. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a processing system comprising a processor, from a mobile user equipment, a first channel quality assessment of a non-reduced power subframe of a wireless signal;
   receiving, by the processing system, from the mobile user equipment, a second channel quality assessment of an almost blank subframe of the wireless signal;
   comparing, by the processing system, a difference value between the first channel quality assessment and the second channel quality assessment to a threshold value; and
   determining, by the processing system, that the mobile user equipment is performing instantaneous channel quality measurements based the comparing of the difference value to the threshold value.

2. The method of claim 1, further comprising providing, by the processing system, an instruction to the mobile user equipment to cause the mobile user equipment to perform the first channel quality assessment of the non-reduced power subframe of the wireless signal.

3. The method of claim 2, wherein the instruction identifies the non-reduced power subframe from among a plurality of non-reduced power subframes.

4. The method of claim 1, further comprising providing, by the processing system, an instruction to the mobile user equipment to cause the mobile user equipment to perform the second channel quality assessment of the almost blank subframe.

5. The method of claim 4, wherein the instruction identifies the almost blank subframe from among a plurality of almost blank subframes.

6. The method of claim 1, further comprising calculating, by the processing system, the difference value between the first channel quality assessment and the second channel quality assessment.

7. The method of claim 1, further comprising sending, by the processing system and in response to determining that the mobile user equipment is performing instantaneous measurements, an instruction to the mobile user equipment to cause the mobile user equipment to perform subsequent channel quality assessments on a plurality of periodic measurement subframes.

8. The method of claim 7, wherein the plurality of periodic measurement subframes include almost blank subframes of a plurality of almost blank subframes, non-reduced power subframes of a plurality of non-reduced power subframes, or any combination thereof.

9. The method of claim 7, wherein the instruction comprises identifying, by the processing system, a reporting periodicity of a plurality of periodic reporting subframes.

10. The method of claim 7, further comprising:
    calculating, by the processing system, a second difference value between two of the subsequent channel quality assessments; and
    determining, by the processing system, that the mobile user equipment is performing averaging channel quality measurements based on the second difference value not exceeding the threshold value.

11. The method of claim 7, wherein the instruction comprises identifying, by the processing system, a reporting offset of a first reporting subframe of a plurality of periodic reporting subframes, each reporting subframe of the plurality of reporting subframes providing a channel quality assessment result obtained during a respective measurement subframe of the plurality of periodic measurement subframes.

12. The method of claim 11, wherein each reporting subframe of the plurality of periodic reporting subframes is separated from the respective measurement subframe of the plurality of periodic measurement subframes by a measurement offset, wherein the determining of the reporting offset comprises:
    identifying, by the processing system, a first measurement subframe of the plurality of periodic measurement subframes;
    determining, by the processing system, the first reporting subframe by adding to the first measurement subframe the measurement offset; and
    determining, by the processing system, the reporting offset as a number of subframes occurring between a subframe reference and the first reporting subframe.

13. A device, comprising:
    a processing system including a processor; and
    a memory that stores executable instructions that, when executed by the processing system, facilitate performance of operations comprising:
    transmitting a first channel quality assessment of a non-reduced power subframe of a wireless signal to a network server; and
    transmitting a second channel quality assessment of an almost blank subframe of the wireless signal to the network server, wherein a difference value between the first channel quality assessment and the second channel quality assessment is compared to a threshold value by the network server to determine whether instantaneous channel quality measurements are being performed by the device.

14. The device of claim 13, wherein the operations further comprise:
   receiving an instruction from the network server to perform the first channel quality assessment of the non-reduced power subframe of the wireless signal; and
   performing the first channel quality assessment responsive to the receiving of the instruction.

15. The device of claim 14, wherein the operations further comprise selecting the non-reduced power subframe from among a plurality of non-reduced power subframes according to the instruction that is received.

16. The device of claim 13, wherein the operations further comprise:
   receiving an instruction from the network server to perform the second channel quality assessment of the almost blank subframe of the wireless signal; and
   performing the second channel quality assessment responsive to the receiving of the instruction.

17. The device of claim 16, wherein the operations further comprise selecting the almost blank subframe from among a plurality of almost blank subframes according to the instruction that is received.

18. The device of claim 13, wherein the difference value is expressed as a percentage, a decibel value, of any combination thereof.

19. A method, comprising:
   receiving, by a processing system comprising a processor, from a mobile user equipment, a first channel quality assessment of a non-reduced power subframe of a wireless signal;
   receiving, by the processing system, from the mobile user equipment, a second channel quality assessment of an almost blank subframe of the wireless signal;
   determining, by the processing system, that the mobile user equipment is performing instantaneous channel quality measurements based a difference value between the first channel quality assessment and the second channel quality assessment to a threshold value; and
   directing, by the processing system, inter-cell interference cooperation between adjacent cells in a communication network responsive to the determining that the mobile user equipment is performing the instantaneous channel quality measurements.

20. The method of claim 19, wherein the adjacent cells in the communication network include pico-cells, femto-cells, or any combination thereof.

* * * * *